US006239198B1

(12) United States Patent
Abächerli et al.

(10) Patent No.: US 6,239,198 B1
(45) Date of Patent: May 29, 2001

(54) METHOD FOR PREPARING ALKALINE SOLUTIONS CONTAINING AROMATIC POLYMERS

(75) Inventors: Alfred Abächerli; Frank Doppenberg, both of Lausanne (CH)

(73) Assignee: Granit S.A., Lausanne (CH)

( * ) Notice: Subject to any disclaimer, the term of this patent is extended or adjusted under 35 U.S.C. 154(b) by 0 days.

(21) Appl. No.: 09/380,378

(22) PCT Filed: Mar. 20, 1998

(86) PCT No.: PCT/IB98/00512

§ 371 Date: Sep. 1, 1999

§ 102(e) Date: Sep. 1, 1999

(87) PCT Pub. No.: WO98/42912

PCT Pub. Date: Oct. 1, 1998

(30) Foreign Application Priority Data

Mar. 20, 1997 (CH) .................................................. 0672/97

(51) Int. Cl.⁷ ............................... C08K 5/13; C07G 1/00; C08L 97/00
(52) U.S. Cl. ............................ 524/74; 527/400; 530/500; 530/506; 530/507
(58) Field of Search ................................... 524/9, 72, 74; 527/400; 530/500, 506, 507

(56) References Cited

U.S. PATENT DOCUMENTS 3,984,362 * 10/1976 Sirianni et al. ........................ 524/76

* cited by examiner

*Primary Examiner*—Nathan M. Nutter
(74) *Attorney, Agent, or Firm*—Nixon & Vanderhye

(57) ABSTRACT

The invention proposes a process which enables separation of aromatic polymers which can be precipitated by acidification, as can be found especially in waste water from cellulose production, from an alkaline solution in a reliable manner and in pure form. To achieve good separation capacity, especially by filtration, it is proposed that the polymers be precipitated by reducing the pH at a relatively low temperature, typically between 15 and 60° C., and the dispersion be subsequently reheated until it passes into filterable form, typically between 50 and 95° C. The product separated in this way for example by filtration can be washed and can be dried at a high temperature, especially up to 110° C., without becoming black.

21 Claims, 2 Drawing Sheets

METHOD FOR PREPARING ALKALINE SOLUTIONS CONTAINING AROMATIC POLYMERS

This application claims benefit of priority from PCT/IB98/00512 filed Mar. 20, 1998.

The invention relates to a process for treatment of aromatic polymer-containing alkaline solutions which can be precipitated by acidification and which allows separation of these polymers in solid form and drying in air at normal pressure and using temperatures between 40 and 110° C. without becoming black.

Most aromatic polymers are easily soluble under alkaline conditions. In certain cases, as in lignins obtained by alkaline leaching of wood, acidification enables precipitation and separation thereof. The problem which arises in doing so consists in finding out whether the precipitated product can be filtered and dried. It often precipitates specifically in gelatinous form and then cannot be centrifuged and is even less filterable. Even in the cases in which separation is possible by filtering or centrifuging, the resulting product tends to become black during drying. This often applies in lignins which have been subjected to chemical changes, in the course of which groups are introduced which increase the polarity of the molecules, i.e. improve solubility. It is thus difficult to find a process with which the separation of products of good quality is possible and which works for any type of precipitatable aromatic polymers. But there are still problems in conjunction with the low concentration (less than 15% by weight polymers). It is often impossible to separate polymers in these cases, even if the known processes described below are effective for the same polymers at higher concentrations. Based on the increased investment costs and the increased power consumption in industrial plants concentration by evaporation is not a solution to this problem either. It is rather a matter of finding an alternative method which is reliable and economical.

The literature contains a large number of proposals for separation of this type of polymer, especially lignins, and for improving filterability. These processes include use of a mineral or organic acid for reducing the pH at a relatively high optimized temperature and subsequent filtration of the resulting precipitate with reheating (Wienhaus et al., Papier 1990 (11), pp. 563–569; Binglin, Water Treatment 1988 (3), pp. 445–454; Alen at al., Tappi 1979 (11), pp. 108–110).

A process with which it would be possible to make the separated product filterable and dryable and which is effective however for any type of aromatic polymers for which there is a precipitation pH in an aqueous medium has not been known to date.

The object of the invention is to avoid the above described defects of the known processes. To achieve this object it is proposed as claimed in the invention that the solution be acidified and afterwards heated and the resulting precipitate separated as a solid. This process may seen nonsensical because in cold precipitation a mixture is produced which is extremely viscous and which has a very gelatinous appearance. In addition the precipitated polymers contained in this viscous suspension cannot be separated either by centrifuging or by filtration or by other methods. The suspension first becomes more liquid upon reheating and at a certain time exceeds a threshold (depending on the polymer type around 40–80° C.) at which it surprisingly becomes filterable and gives no occasion for undesirable coloration during drying. The exact temperature at which good filtration becomes possible depends largely on the respective polymer and must be optimally selected for each case.

The surprising element consists in that it is not a process which can be reversed in terms of heat engineering. It is absolutely essential to precipitate at a relatively cool temperature and afterwards to heat. If precipitation is done at an optimum temperature without reheating after precipitation, in certain cases a reasonable filtration capacity can be achieved; the result however is far from that effect which is achieved with proposed processes. Filtration takes place less promptly, and in most cases, for example in polymers with a relatively low precipitation pH of less than 5, the polymer becomes completely black during drying.

Especially good and reproducible results were achieved here when the polymers to be precipitated have the criteria that the peak on the viscosity curve is below pH of 8 or a lower inflection point is located on the titration curve below a pH of 6.5.

The main advantage of the invention is that it enables production of products with very low contents of water-soluble minerals, especially sodium salts and hemicelluloses, at very low cost. When using products for example as copolymers in plastic materials (duroplastics or thermoplastics) the purity is an important factor for technical data (mechanical properties, absence of electrolytes, such as sodium, for electrical insulation capacity, etc.) of the end material. Since the product can easily be filtered using for example a Buechner filter or band filter, specifically the salts can be removed by washing. In particular in the case of highly diluted solutions, for example waste water from certain cellulose plants with increased consumption of washing water, the described process allows separation of a quality product at a competitive price, since the energy necessary for evaporation is saved.

Filtration can be further improved when the product is allowed to mature after reheating for a few minutes with moderate to vigorous and very uniform stirring. This maturation time must however be limited. If it is extended over a very long time, for example by allowing the liquid to stand warm for several hours or by allowing it to cool, the filtration time increases again. In addition, cooling of the liquid following the primary stage of reheating or optionally also after an additional maturing time leads to an increase of the filtration rate.

As another optional step the invention allows sedimentation of the polymer before filtration. In this way a reduction of the amount of water to be filtered by a factor over 5 which can extend to more than 20 is possible. In following the entire process as claimed in the invention the decisive factor is the pH value to enable sedimentation. If it is not low enough, the product does not settle even if it is filterable. This pH is typically at least one point below the peak of the viscosity curve. If conversely the pH value is too low, the filtration rate can become slower again.

Other additional treatments can be done before or after precipitation and before or after heating: addition of flocculants ($FeCl_3$, $Al_2(SO_4)_3$) or of polyelectrolytes (for example of the acrylic type) and electrolytic flocculation treatment. These measures can further improve separability and can also increase the amount of solids which can be separated, since they also allow precipitation of additional polymer fractions. The effectiveness of the flocculation aids is especially great in most cases when they are added before acidification and before heating.

On the other hand, this process makes it possible to form a great diversity of new technical approaches to obtaining polymers with special properties adapted to the requirements. Due to the improved separation of polymers it becomes possible specifically to undertake chemical changes in the aqueous alkaline phase without the product thus becoming more difficult to separate and purify. The reactions which can take place in these changes include all those reactions which introduce chemical groups which change the charge distribution and thus the precipitation behavior: etherification (methylation, ethylation, carboxymethylation, alkoxylation with epoxy, etc.) and esterification (sulfonation, nitration, reactions with organic acids or diacids, etc.). The chemical reactions which form new functional groups by decomposition of the polymer are also named: oxidations, for example with oxygen, hydrogen peroxide, ozone, oxidation salts, such as periodates or permanganates, oxoammonolysis, oxidative or reductive electrochemical reactions or enzymatic reactions. These reactions can even influence the distribution of molecular size and especially cause a reduction of the average molecular size, but also condensations.

These reactions can be accomplished on solutions which were produced from the polymers already separated beforehand, or they can be carried out directly on waste waters without the need to separate the polymer beforehand and to redissolve them. Some of these modifications, for example oxidation, can even promote filtration, when the process as claimed in the invention is used; this is not the case for known processes.

This can be explained by the fact that the proposed process works better, the lower the maximum of the viscosity as a function of pH, or the lower the lower inflection point on the titration curve. For good operation thereof a certain polarity of the polymer (carboxyl or other polar groups in sufficient number) is essential. For example, certain weakly polar polymers which precipitate at pH values between 8 and 9 cannot be easily brought into a filterable form by this process. The nature of the acid used can be important even at the same pH. More polar acids exhibit a better effect than apolar ones and are preferably used at higher pH of the inflection point optionally jointly with $CO_2$.

These changes allow the properties of the polymers to be influenced and controlled; they then can be separated using the process as claimed in the invention and can be recovered in a commercially usable form. Based on their special properties these polymers therefore represent high performance products for use in plastic materials as copolymers, fillers or additives (antioxidants, production aids, dispersants for pigments, emulsifiers, flame-resistant substances). They can also be used as surfactants (dispersants, emulsifiers, surfactants), as complex-forming agents (sequestration agents, chelates, fixing agents for heavy metals) and in the area of nutrition and medicine as a high purity product with emulsifying, dispersing, antioxidizing, antibacterial, antiviral and digestion-regulating (antidiarrheal) properties for improving the energy yield of foods.

In the industrial sector, especially in cellulose plants, after separation of polymers the filtrate can be treated by means of conventional water treatment systems such as biological anaerobic and/or aerobic treatments and oxidation in the wet phase. Biological treatment is facilitated especially as a result of the reduction of loading with aromatic polymers which act as inhibitors. In the case of wet oxidation the lignin contributes to economic profitability of the entire treatment process due to the profit as a result of its sale. Thus this invention allows formation of a profitable system for treatment of industrial waste water.

Another important advantage of the process as claimed in the invention consists in a much lower water content of the polymer after separation, especially after filtration. In the cases in which separation of the polymers with existing methods is possible, the water contents are often in the range from 75 to 85%. At the same concentrations the new method allows water reduction down to 50% by weight. This corresponds to a factor between 3 and 5.6 for the amount of energy needed for drying.

BRIEF DESCRIPTION OF THE DRAWINGS

The invention is detailed below using the figures and embodiments. In the drawings

DESCRIPTION OF THE PREFERRED EMBODIMENTS

Example 1

Figure 1:
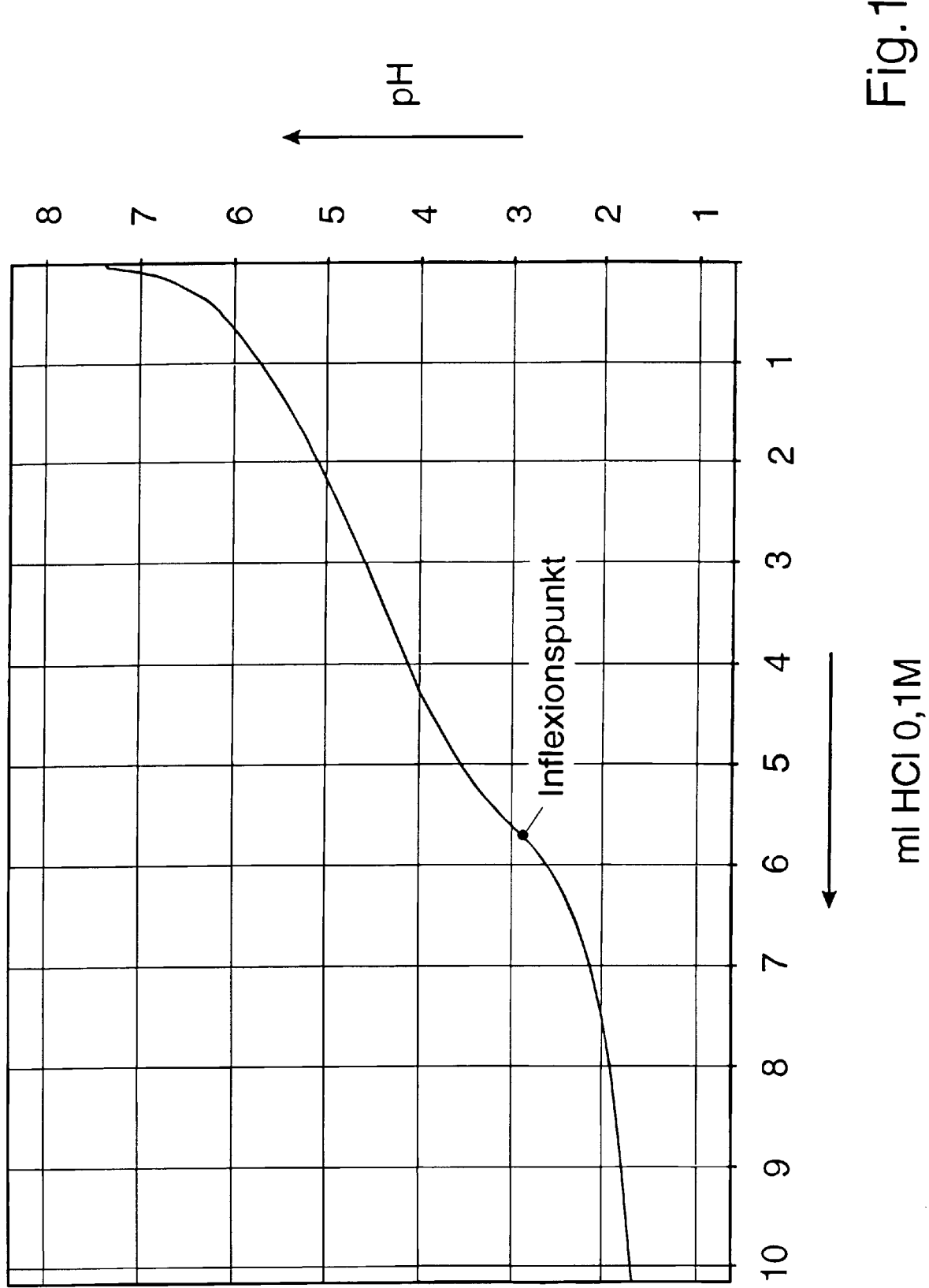
FIG. 1 shows the titration curve for the black liquor according to example 1.
Figure 2:
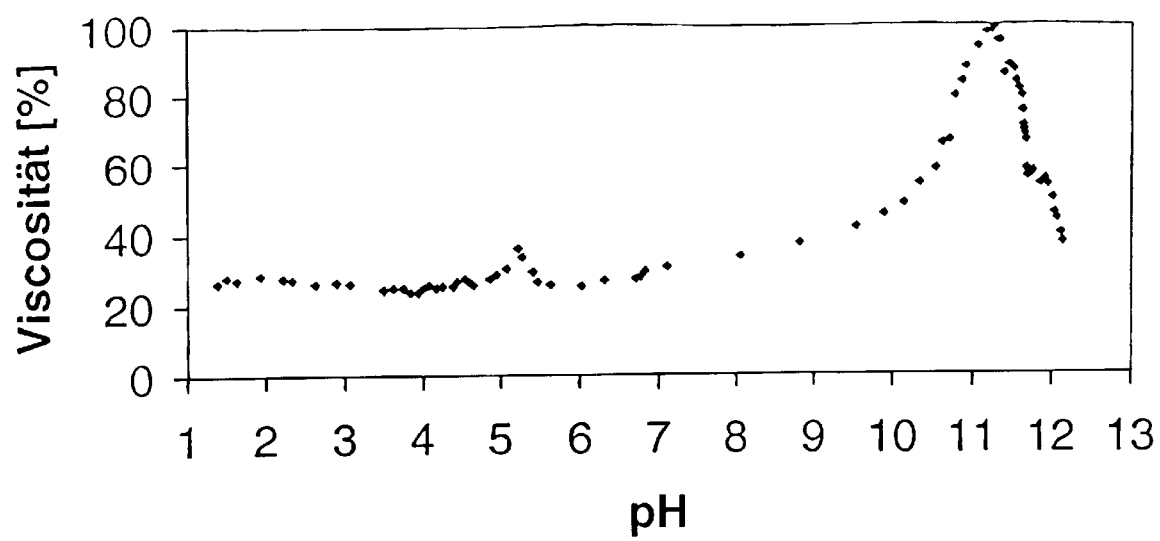
FIG. 2 shows the viscosity values as a function of the pH for the black liquor according to example 1 and FIG. 3 shows a representation according to FIG. 2 for the black liquor as claimed in example 5.

Black liquor from straw with a CSB of 115 g/l and a total alkali content expressed in sodium hydroxide of 17.4 g/l, an inflection point on the titration curve at pH 2.9, as is shown in FIG. 1, and a maximum on the viscosity curve at pH 2.1, as is shown in FIG. 2, at a temperature of 85° C. is acidified with sulfuric acid to a pH 1.0. The resulting precipitate passes through any type of filter paper.

The same liquor is acidified at a temperature of 35° C. with sulfuric acid to pH 1.0. The resulting precipitate almost immediately clogs any type of filter paper and can be separated neither by sedimentation nor by centrifuging.

The lignin separated from the same liquor by flocculation using polyelectrolytes and by centrifuging has a coal-like appearance when it is dried in air and it has an ash content of 27.2%.

200 ml of the same liquor are acidified at a temperature of 35° C. with sulfuric acid to pH 1.0, heated to 85° C. and kept at this temperature for 10 minutes with uniform stirring during the entire process. The suspension is then cooled to 30° C. This liquid can be sedimented and can be filtered via a Buechner filter 7 cm in diameter in a period of 7 minutes. Washing with 50 ml water lasts 5 minutes. The cake dried in a furnace at 80° C. has a clear yellow color, an ash content of 1% by weight, a carboxyl group content of one milliequivalent per gram of dry substance and weighs 7.9 g. The filtrate has a CSB of 65.7 g/l.

If 200 ml are mixed at 85° C. with 25 ppm of a cationic acrylic amide flocculent and then precipitated at a pH 2.0, the filtration time is 30 minutes. If the flocculent is added at 25° C. and precipitation is done at the same temperature and at pH 2.0, the filtration time after heating to 85° C. is only 8 minutes.

Example 2

200 ml of black liquor from paper hemp with a CSB of 165 g/l, a total alkali content in sodium hydroxide of 57.5 g/l, an inflection point on the titration curve at pH 6 and a peak on the viscosity curve at pH 5.5, at a temperature of 65° C. are acidified with sulfuric acid to a pH 5. This liquid can be filtered in an interval of 30 min via a Buechner filter with a diameter of 7 cm. Washing with 10 ml lasts 30 min. The cake contains 80% by weight moisture. It is divided into two parts. The first is dried for several days at ambient temperature and then has a highly dark brown color and weighs 8.2 g. The second part is dried in a furnace at 80° C. and becomes completely black and very hard and brittle. It weights 7.9 g. The ash content of the two parts is 1% by weight. Washing with more than 10 ml water is not possible, since this leads to blockage of the filter.

200 ml of the same liquor at a temperature of 35° C. are acidified with sulfuric acid to a pH 5 and afterwards heated to 65° C. with simultaneous stirring during the entire process. This liquid can be filtered in an interval of 9 min via a Buechner filter with a diameter of 7 cm. Washing with 50 ml water lasts 4 min. The cake contains 50% by weight moisture. It is dried in a furnace at 80° C., it has a bright brown color and an ash content of 0.1% by weight.

Example 3

10 g of the product from example 2 are dissolved in 100 ml water with 1 g NaOH and 3 g ethylene oxide. The solution is allowed to react for 10 hours. Afterwards at a temperature of 65° C. it is acidified with sulfuric acid to pH 5. This liquid can be filtered in an interval of 2 h via a Buechner filter with a diameter of 7 cm. Washing with 50 ml water lasts 1 h. The resulting product becomes completely dark after drying at ambient temperature and very hard and brittle.

The same solution after conversion with ethylene oxide is acidified at 35° C., heated to 65° C., and kept at this temperature for 10 minutes with simultaneous stirring during the entire process. The suspension is cooled afterwards to 30° C. This liquid can be filtered via a Buechner filter with 7 cm diameter in an interval of 4 min. Washing with 50 ml water lasts 30 s. The cake contains 50% by weight moisture. It is dried in a furnace at 80° C., it has a bright-brown color, and an ash content of 0.1% by weight.

Example 4

One liter of waste water from cellulose production from straw at the output of biological treatment with a CSB of 3 g/l are acidified at a temperature of 35° C. with sulfuric acid to pH 0.5 and afterwards heated to 40° C. with uniform stirring during the entire process. The suspension is then allowed to settle for 15 min and the supernatant is separated. It has a CSB of 0.9 g/l. The resulting volume is 200 ml. This liquid is then heated to 65° C. and allowed to settle again for 15 minutes and decanted. The remaining volume is then 50 ml. It can then be filtered via a Buechner filter 7 cm in diameter within 1 minute. Washing with 50 ml water lasts 15 s. The cake dried in a furnace at 80° C. has a bright brown color and an ash content of 1% by weight.

Example 5

Figure 3:
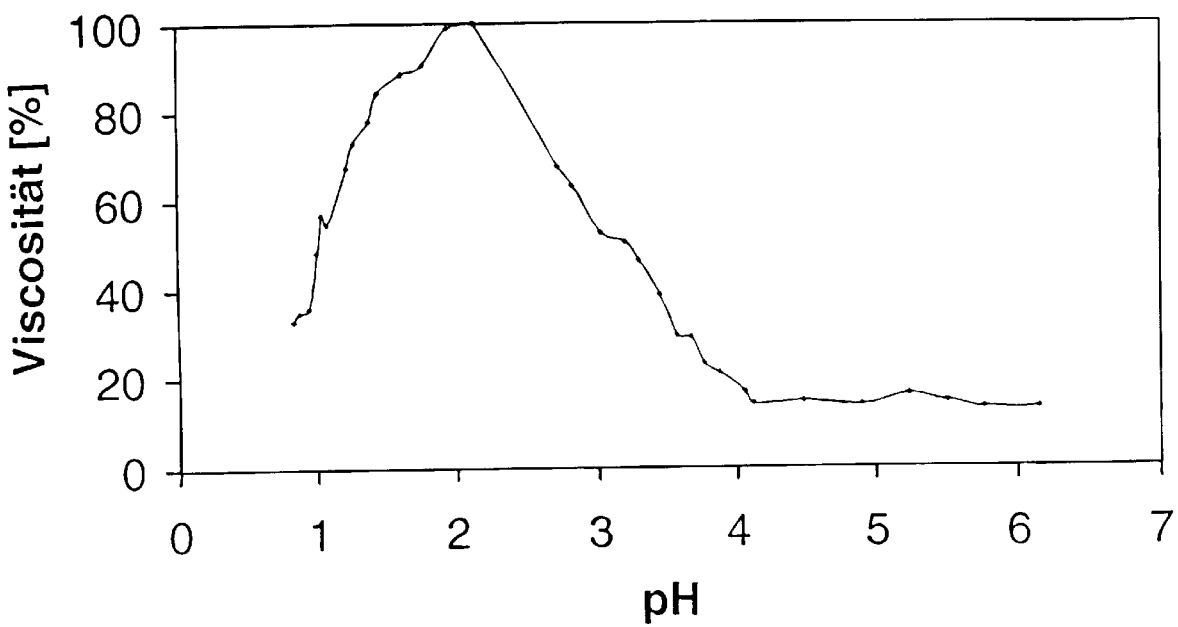

200 ml of the black liquor as in example 1 are mixed with 3 g of calcium oxide and stirred for 10 hours at 60° C. This liquid has two peaks for the viscosity, one at pH 11.1 and one at pH 5.3, as is shown in FIG. 3. 50 ml of this sample are acidified at 60° C. by blowing in $CO_2$ up to a pH of 9.0. The resulting liquid cannot be filtered and is centrifuged for 5 minutes at 4500 rpm. After subsequent separation of the two phases 40 g are in the sedimented phase and only 10 g in the liquid phase.

Another 50 ml are likewise brought to a pH of 9.0 at 20° C. likewise with $CO_2$ and then held at 60° C. for 20 minutes. When centrifuged the liquid yields a ratio of sediment to liquid phase of 1 to 3.

What is claimed is:

1. A process of recovering aromatic polymers in solid form from an alkaline solution containing said polymers, said process comprising the sequential steps of:

(1) acidifying an alkaline solution containing aromatic polymers, which can be precipitated by acidification, separated in solid form and dried, to precipitate the aromatic polymers in the solution, (2) heating the acidified solution of step (a) to a temperature between 40 to 100° C. without blackening the precipitate, and thereafter (3) separating the precipitate as a solid.

2. A process for recovering aromatic polymers in solid form from a lignin-containing alkaline solution, said process comprising the sequential steps of:

(1) acidifying a lignin-containing alkaline solution containing lignin polymers which can be precipitated by acidification, separated in solid form and dried, to precipitate the lignin polymers in the solution, (2) heating the acidified solution of step (a) to a temperature between 40 to 100° C. without blackening the precipitate, and thereafter (3) separating the lignin precipitate as a solid.

3. The process of claim 1 or 2 wherein the polymers are precipitated at a peak on a viscosity curve of pH 8 or below.

4. The process of claim 1 or 2 wherein the polymers are precipitated at a lower inflection point on a titration curve below pH 6.5.

5. The process of claim 1 or 2 wherein precipitation takes place at a temperature between 0 and 90° C.

6. The process of claim 5 wherein precipitation takes place at a temperature between 15 and 60° C.

7. The process of claim 1 or 2 wherein the polymers contain weakly acidic groups and precipitation takes place at a pH of from 0 to 3 units below the pH of the pH of the inflection point of the weakly acidic groups of the polymers on their titration curve.

8. The process of claim 1 or 2 wherein the heating of step (2) is between 2 and 100° C.

9. The process of claim 8 wherein the heating of step (2) is between 20 to 50° C.

10. The process of claim 1 or 2 the acidification of step (1) is conducted by adding a mineral or organic acid in liquid or gaseous form.

11. The process of claim 1 or 2 wherein the precipitate is separated by filtration, centrifugation, flotation or sedimentation.

12. The process of claim 11 wherein the precipitate is filtered and the solid particles are washed with water at a temperature between 35 and 100° C.

13. The process of claim 1 or 2 wherein the precipitation occurs at a pH below a peak of the liquid viscosity which changes with variable pH, but not more than 3 pH units below it.

14. The process of claim 1 or 2 wherein the alkaline solution treated in step (1) is waste water from cellulose produced from natural ligno cellulose-containing substances.

15. The process of claim 1 or 2 wherein the alkaline solution treated in step (1) contains lignins which precipitate at an acid pH.

16. The process of claim 1 or 2 wherein the alkaline solution treated in step (1) also contains other aromatic polymers which precipitate at an acid pH and which are soluble under alkaline conditions.

17. The process of claim 1 or 2 wherein the precipitate is separated by filtration in combination with at least one of:
 (a) continuous, uniform stirring during the filtration process,
 (b) maturation for at least 2 minutes while maintaining the temperature constant,
 (c) prior to step (2) cooling the aqueous solution by at least 5° C.,
 (d) sedimentation and separation of the aqueous solution heated in step (2) prior to step (3),
 (e) partially heating the alkaline solution after step (2) and prior to step (3) by at least 2° C. on the sediment after separation of a liquid phase, or
 (f) in addition to (e) conducting a second sedimentation before step (c).

18. The process of claim 1 or 2 wherein precipitation of the solid polymer is improved by the addition of a flocculent during step (3).

19. The process of claim 1 or 2 wherein the polymers in the alkaline solution are separated in a plurality of polymer fractions in a plurality of stages by reducing the pH in each stage to a maximum value of a desired fraction according to its viscosity curve.

20. The process of claim 1 or 2 wherein the concentration of polymer in the aqueous solution treated in step (1) is less than 10% by weight relative to the dry polymer.

21. The process of claim 20 wherein the concentration of the polymer is between 0.5 and 6% by weight.

* * * * *